[12] United States Patent
Anderson et al.

(10) Patent No.: US 8,032,661 B2
(45) Date of Patent: Oct. 4, 2011

(54) AUTOMATIC PERIPHERAL DEVICE SHARING

(75) Inventors: Robert J Anderson, Snoqualmie, WA (US); Lindsey R Noll, Seattle, WA (US); Frank Olivier, Seattle, WA (US); J Adrian Lannin, Sammamish, WA (US); Shawn E Maloney, Redmond, WA (US); Steve Seixeiro, Snohomish, WA (US); Jerry Koh, Bothell, WA (US); Daniel J Oliver, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 314 days.

(21) Appl. No.: 12/039,702

(22) Filed: Feb. 28, 2008

(65) Prior Publication Data

US 2009/0222592 A1    Sep. 3, 2009

(51) Int. Cl.
  *G06F 3/00* (2006.01)
  *G06F 3/01* (2006.01)
(52) U.S. Cl. .............................................. 710/2; 710/8
(58) Field of Classification Search .................. 710/8, 2
  See application file for complete search history.

(56) References Cited

U.S. PATENT DOCUMENTS

| | | | |
|---|---|---|---|
| 5,960,167 A | 9/1999 | Roberts et al. | |
| 6,789,111 B1 | 9/2004 | Brockway et al. | |
| 6,892,230 B1 | 5/2005 | Gu et al. | |
| 6,967,734 B1 | 11/2005 | Wang et al. | |
| 7,143,150 B1 | 11/2006 | Nuggehalli | |
| 7,185,074 B2 | 2/2007 | Schacht et al. | |
| 2005/0232583 A1* | 10/2005 | Kubota | 386/46 |
| 2005/0235077 A1* | 10/2005 | Kubota | 710/62 |
| 2006/0129700 A1* | 6/2006 | Bopardikar | 710/2 |
| 2007/0086052 A1 | 4/2007 | Furuya | |
| 2007/0088814 A1 | 4/2007 | Torii | |
| 2007/0220142 A1 | 9/2007 | Moorer et al. | |

OTHER PUBLICATIONS

UPnP Device Architecture 1.0, Jul. 20, 2006, UPnP Forum.*
Sharon Crawford, 'What's the Big Deal about UPnP in Windows XP?', Jul. 22, 2002, Microsoft.*
Hoffman, "Konica Minolta Multifunction Printers to Support Vista Web Services", Feb. 26, 2007, Ziff Davis Enterprise Inc., pp. 1-3.
"Web Services on Devices", Microsoft Corporation, 2007, pp. 1-5.
"PnP-X: Plug and Play Extensions for Windows", Version 1.0c, Jan. 11, 2007, Microsoft Corporation, pp. 33.
Kuchinskas, "Microsoft Wants Everybody Talking . . . via Web Services", Enterprise News, Apr. 29, 2005. pp. 1-3.

* cited by examiner

*Primary Examiner* — Henry Tsai
*Assistant Examiner* — Hyun Nam

(57) ABSTRACT

In accordance with the automatic peripheral device sharing, a peripheral device that has been newly installed on a device is detected and is shared with one or more additional devices coupled to the device. A notification of the peripheral device is automatically published to the one or more additional devices. This notification includes an indication of how the one or more additional devices can access the peripheral device. Each of the one or more additional devices can receive this notification and determine whether the peripheral device can be automatically installed on that device without user input. For each of the one or more additional devices, the peripheral device is installed on that device only if the peripheral device can be automatically installed on that device without user input.

17 Claims, 5 Drawing Sheets

AUTOMATIC PERIPHERAL DEVICE SHARING

BACKGROUND

As computing devices have become more affordable, increasing numbers of homes and other locations are networking multiple computing devices together. However, one problem faced when networking multiple computing devices together is the sharing of peripheral devices (peripherals) by those multiple devices. Oftentimes a peripheral will be connected to a particular one of the multiple devices with the desire by the user(s) that all of the multiple devices be able to access the peripheral. Although a user can oftentimes manually configure the multiple devices to access such a peripheral, this manual configuration can be a burdensome and difficult process for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the automatic peripheral device sharing, a peripheral device that has been newly installed on a computing device is detected and is shared with one or more additional computing devices coupled to the computing device. A notification of the peripheral device is automatically published to the one or more additional computing devices. This notification includes an indication of how the one or more additional computing devices can access the peripheral device.

In accordance with one or more aspects of the automatic peripheral device sharing, a published notification of a remote peripheral device coupled to a different computing device is received at a computing device. A determination is made as to whether the remote peripheral device can be automatically installed on the computing device without user input. The remote peripheral device is installed on the computing device only if the remote peripheral device can be automatically installed on the computing device without user input.

BRIEF DESCRIPTION OF THE DRAWINGS

The same numbers are used throughout the drawings to reference like features.

DETAILED DESCRIPTION

Automatic peripheral device sharing is discussed herein. In a network environment, the existence of a newly installed peripheral device that has been connected to one of the networked devices is detected. This new peripheral device is automatically shared and a notification of this new peripheral device, including an indication of how to access the peripheral device, is made available to all other devices in the network environment. Each of these other devices in the network environment receives the notification and installs the peripheral device only if installation can be performed automatically without any user input. The peripheral device is then available to the users of all the devices in the network environment on which the peripheral device is installed without requiring any manual setup or configuration by the user.

Figure 1:
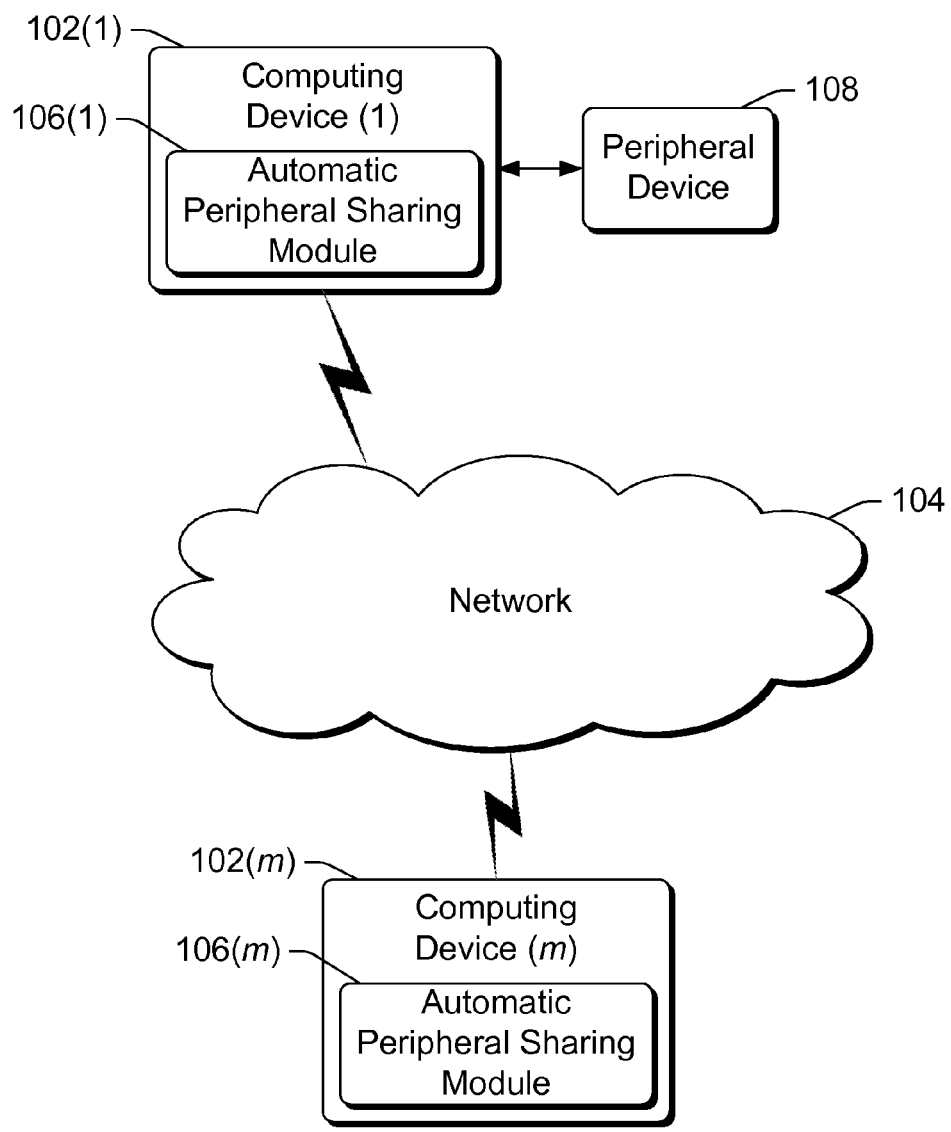
FIG. 1 illustrates an example system implementing the automatic peripheral device sharing in accordance with one or more embodiments.

FIG. 1 illustrates an example system 100 implementing the automatic peripheral device sharing in accordance with one or more embodiments. System 100 includes multiple (m) networked computing devices 102(1), . . . , 102(m) that are coupled to one another and can communicate with one another via a network 104. Network 104 can be any of a variety of data communication networks, such as a local area network (LAN). Network 104 can be implemented using wired and/or wireless data connections, and can employ any of a variety of public and/or proprietary protocols. Network 104 can employ any of a variety of networking components to couple computing devices 102 to one another, such as hubs, switches, and so forth. Network 104 can also be implemented using direct connections, with computing devices 102 being directly coupled to one another without any such intervening networking components.

Each computing device 102 can be any of a variety of types of devices, and different computing devices 102 in system 100 can be the same or different types of devices. For example, a computing device 102 can be a desktop computer, a mobile station, an entertainment appliance, a set-top box communicatively coupled to a display device, a wireless phone, a game console, an automotive computer, and so forth. Thus, a computing device 102 may range from a full resource device with substantial memory and processor resources (e.g., personal computers, game consoles) to a low-resource device with limited memory and/or processing resources (e.g., traditional set-top boxes, hand-held game consoles).

Each computing device 102 includes an automatic peripheral sharing module 106(1), . . . , 106(m). Each automatic peripheral sharing module 106 automatically shares and notifies the other computing devices 102 of any installed peripheral devices. Each automatic peripheral sharing module 106 also receives notifications of installed peripheral devices from other computing devices 102 and makes those peripheral devices available to users of the devices 102. For example, assume a peripheral device 108 is coupled to computing device 102(1). Automatic peripheral sharing module 106(1) automatically configures computing device 102(1) and peripheral device 108 to share peripheral device 108 with the other computing devices 102, and publishes a notification to the other computing devices 102 of how to access peripheral device 108. Automatic peripheral sharing module 106(m) receives this notification, installs the peripheral device on computing device 102(m), and makes peripheral device 108 available to users of computing device 102(m). The operation of automatic peripheral sharing modules 106 is discussed in more detail below.

The peripheral devices, also referred to as peripherals, can be any of a variety of different types of devices. In one or more embodiments, the peripheral devices are printers. Alternatively, other types of peripheral devices can be used with the techniques discussed herein, such as scanners, fax machines, cameras, storage devices (e.g., hard disk drives), digital music players (e.g., MP3 players), video projectors, and so forth.

Figure 2:
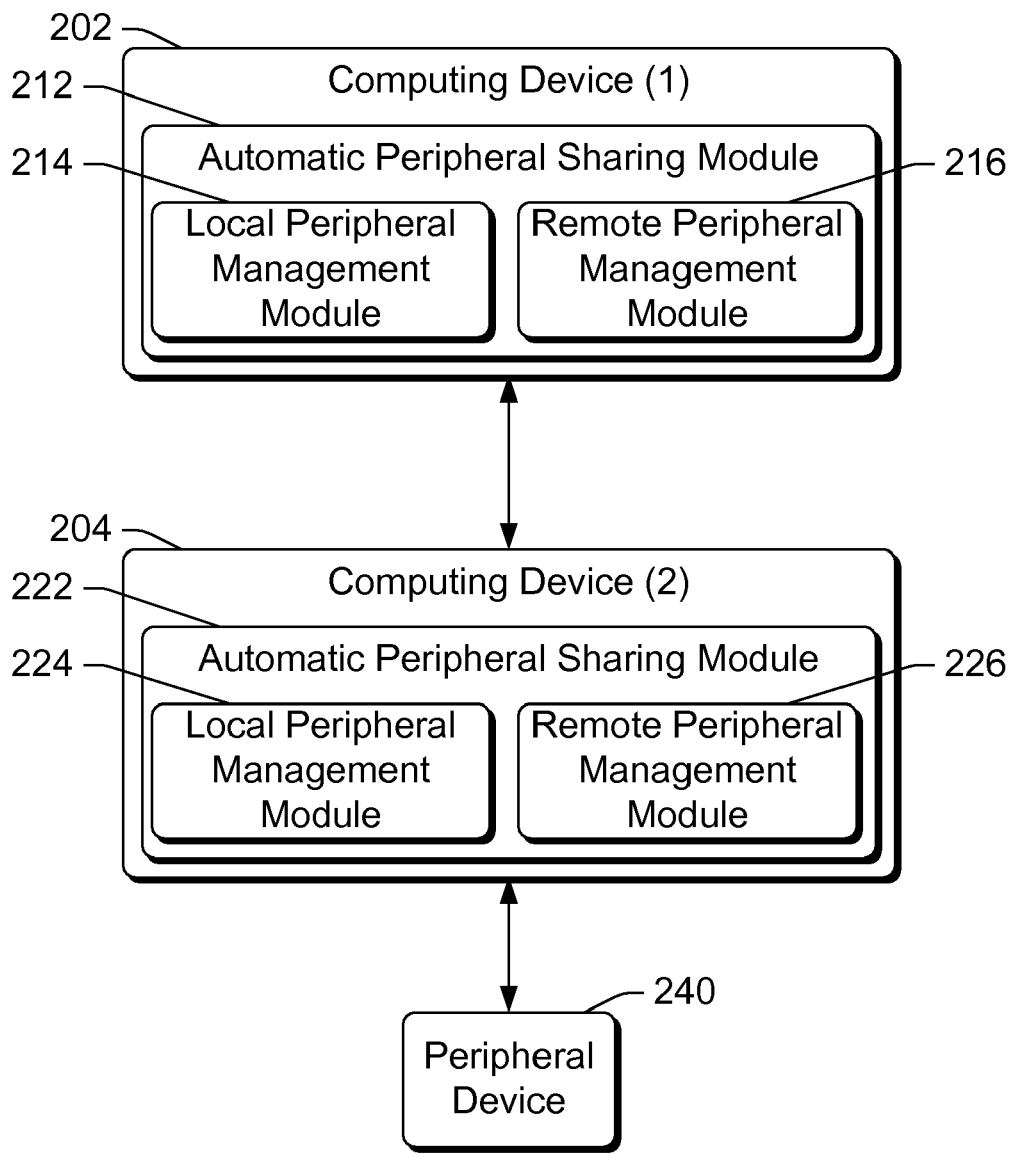
FIG. 2 is a block diagram illustrating example computing devices implementing the automatic peripheral device sharing in accordance with one or more embodiments.

FIG. 2 is a block diagram illustrating example computing devices implementing the automatic peripheral device sharing in accordance with one or more embodiments. Computing devices 202 and 204 are illustrated in FIG. 2, and each of devices 202 and 204 can be a computing device 102 of FIG. 1. For ease of explanation only two computing devices are illustrated in FIG. 2. It is to be appreciated that, as discussed above, an additional computing device(s) can also be coupled to computing devices 202 and 204.

Computing device 202 includes an automatic peripheral sharing module 212 having a local peripheral management module 214 and a remote peripheral management module 216. Local peripheral management module 214 manages the automatic peripheral device sharing for peripheral devices connected to computing device 202, and remote peripheral management module 216 manages the automatic peripheral device sharing for peripheral devices connected to other computing devices (e.g., computing device 204). Similarly, computing device 204 includes an automatic peripheral sharing module 222 having a local peripheral management module 224 that manages the automatic peripheral device sharing for peripheral devices connected to computing device 204. Automatic peripheral sharing module 222 also includes a remote peripheral management module 226 that manages the automatic peripheral device sharing for peripheral devices connected to other computing devices (e.g., computing device 202).

A peripheral device 240 is connected to computing device 204. This connection can be any of a variety of different connections, such as a USB (Universal Serial Bus) connection, a parallel port connection, an IEEE 1394 connection, a wireless connection (e.g., a wireless USB connection), a network connection (e.g., a LAN, a wireless LAN, etc.), and so forth. Typically, computing device 204 performs an installation process when peripheral device 240 is first connected to computing device 204. The installation process can be performed automatically by a peripheral feature component of an operating system running on computing device 204 when peripheral device 240 is connected to computing device 204, such as in accordance with plug-and-play or hotplug systems. For example, in embodiments where peripheral device 240 is a printer, the installation process can be performed by a print spooler component. Alternatively, the installation process can be performed manually by a user requesting that the installation be performed.

The installation process configures computing device 204 so that applications running on computing device 204 can use and optionally otherwise communicate with peripheral device 240. The installation process allows applications running on computing device 204 to print to a peripheral device that is a printer, to record music to and/or playback music from a peripheral device that is a digital music player, and so forth. This installation process can involve various steps, such as installing an operating system representation of the peripheral device on computing device 204 (e.g., a print queue if the peripheral device is a printer), installing a software driver allowing applications running on computing device 204 to transfer data to and/or from peripheral device 240, recording configuration information for accessing peripheral device 240 in an operating system registry or other operating system record, and so forth. This installation process typically occurs the first time peripheral device 240 is connected to computing device 204 and typically need not be repeated if peripheral device 240 is disconnected and subsequently reconnected to computing device 204.

Local peripheral management module 224 detects when a peripheral device, such as peripheral device 240, is newly installed on computing device 204. Local peripheral management module 224 performs this detection by detecting when the installation process for peripheral device 240 is performed. This detection of the installation process being performed can be carried out in different manners. In one or more embodiments an operating system running on computing device 204 uses a peripheral management component (e.g., a print spooler component if peripheral device 204 is a printer) that provides notifications of newly installed peripheral devices, peripheral devices that have been uninstalled, changes that have been made to peripheral devices, and so forth. In such embodiments, local peripheral management module 224 registers with the peripheral management component to receive notifications of newly installed peripheral devices. When peripheral device 240 is newly installed on computing device 204, the peripheral management component sends a notification to local peripheral management module 224 identifying peripheral device 240 as a newly added peripheral device.

Alternatively, other mechanisms can be used to detect when peripheral device 240 is newly installed on computing device 204. For example, an operating system registry or other record of peripheral devices that have been installed on computing device 204 can be maintained. Local peripheral management module 224 can monitor this operating system registry or other record to identify when a new peripheral device is added to the registry or record. By way of another example, part of the installation process can be to send a notification to local peripheral management module 224 of the newly added peripheral device, such as by sending a message, invoking an application programming interface (API) exposed by local peripheral management module 224, and so forth. By way of yet another example, another component (such as the software driver for the peripheral device) can send a notification of the newly added peripheral device to local peripheral management module 224.

Once local peripheral management module 224 detects peripheral device 240 being newly installed on computing device 204, module 224 automatically shares peripheral device 240. In automatically sharing peripheral device 240, module 224 configures computing device 204 to share peripheral device 240 so that other computing devices (such as computing device 202) can access peripheral device 240. The manner in which module 224 automatically shares peripheral device 240 can vary. In one or more embodiments, a peripheral management component of computing device 204 (e.g., a print spooler component if peripheral device 240 is a printer) maintains a record or flag for each peripheral device installed on computing device 204, the record or flag indicating whether the peripheral device is shared. In such embodiments, module 224 invokes an API of the peripheral management component, or otherwise accesses the peripheral management component, to set the record or flag for peripheral device 240 to indicate that peripheral device 240 is shared.

Alternatively, module 224 can automatically share peripheral device 240 in other manners. For example, an operating system registry or other record of which peripheral devices are shared can be maintained by computing device 204. Module 224 can access this operating system registry or other record and update the information stored in the registry or record to indicate that peripheral device 240 is shared.

In one or more embodiments, all peripheral devices connected to computing device 204 are automatically shared. Alternatively, module 224 can employ a filter so that only particular peripheral devices are automatically shared. This filter can be based on any of a variety of different criteria, such as user preferences, peripheral connection type, peripheral type, and so forth. For example, only peripheral devices connected to computing device 204 in a particular manner (e.g., via a USB connection) may be automatically shared. By way of another example, a user may set a preference that only printers are to be shared, or only particular types of printers are to be shared (e.g., laser printers, color inkjet printers, etc.).

In addition to automatically sharing peripheral device 240, local peripheral management module 224 also optionally automatically configures peripheral device 240 for shared usage. This automatic configuration of peripheral device 240 can include setting various configuration values or other settings of peripheral device 240 and/or computing device 204 for preferences when peripheral device 240 is operating in a shared mode. These preferences can be preferences of an administrator, designer, or other user of computing device 204, and/or preferences of an administrator, designer, or other user of peripheral device 240. For example, for a peripheral device that is a printer, client-side rendering can be enabled so that rendering of documents occurs at the computing device at which printing of the document is requested rather than by the printer or by computing device 204.

This automatic configuration of peripheral device 240 can also include setting various other configuration values or settings of peripheral device 240 for shared usage. In one or more embodiments, these configuration values or other settings are values or settings that are to be set in order for peripheral device 240 to be shared. For example, any of various register settings can be made and/or other data written to memory of peripheral device 240 indicating that peripheral device 240 is shared and/or configuring peripheral device 240 to operate in a shared mode.

In one or more embodiments, automatic configuration of peripheral device 240 includes configuring security settings for peripheral device 240 so that the various users of computing devices 202 and 204 have permission to access peripheral device 240. For example, different security settings of peripheral device 240 (and/or of a software driver for peripheral device 240 that is installed on computing device 204) may allow different users and/or different computing devices to access peripheral device 240. Automatic configuration of peripheral device 240 includes configuring peripheral device 240 (and/or a software driver for peripheral device 240) to allow computing devices and/or users of a particular domain (s) and/or other network group(s) to access peripheral device 240.

Local peripheral management module 224 also publishes a notification of peripheral device 240 that includes an indication of how to access peripheral device 240. Other computing devices, such as computing device 202, can receive this notification and access peripheral device 240 as indicated in the notification, as discussed in more detail below. Publication of the notification refers to sending or otherwise communicating the notification to other computing devices, such as computing device 202. The notification can be published in any of a variety of different manners.

In one or more embodiments, the notification is published using the Web Services on devices technology. Additional information on the Web Services technology is available from Microsoft Corporation of Redmond, Wash. In embodiments using the Web Services technology, the operating systems on computing devices 202 and 204 support the Web Services technology, which allows notifications to be communicated between computing devices 202 and 204.

Alternatively, the notification can be published using any of a variety of different techniques. Any technique that allows messages to be communicated between devices 202 and 204 can be used to publish the notification.

Publication of the notification refers to communicating the notification from computing device 204 to computing device 202 (as well as any other computing devices coupled to computing device 204). As different computing devices can be powered on and/or coupled to device 204 at different times, the publication of the notification allows the notification to be received by computing device 202 regardless of when it is powered on and/or coupled to device 204. For example, a component on computing device 204 or another device may keep a record of notifications that are published when computing device 202 is powered-down or otherwise disconnected from device 204. This record of notifications can then be sent to computing device 202 when it is next powered on or connected to device 204. By way of another example, computing device 204 may publish the notifications at regular or irregular intervals (e.g., every ten minutes, whenever there is a break in which no data is being communicated on the network, and so forth). Computing device 202 will then receive the next published notification after device 202 is powered on or connected to device 204.

The published notification includes an indication of how to access peripheral device 240. This indication of how to access peripheral device 240 can take any of a variety of different forms. In one or more embodiments the indication is a network path name that identifies a path to peripheral device 240 within the network including computing device 204. Alternatively, any of a variety of other mechanisms for identifying the location of peripheral device 240 and/or how to send data to and/or receive data from peripheral device 240 can be used.

The published notification can take any of a variety of different forms. In one or more embodiments, the notification is an eXtensible Markup Language (XML) document that includes the indication of how to access peripheral device 240. The XML document can also optionally include a version number for the automatic peripheral sharing. In some situations, multiple different automatic peripheral sharing protocols can be supported by computing devices, and the version number can be included in the published notification to identify which protocol is being used for the published notification.

In one or more embodiments the published notification is sent without any encryption or digital signatures. Alternatively, in one or more embodiments encryption is used to digitally sign and/or encrypt the published notification. The encryption can be public key encryption and/or symmetric key encryption. The published notification can be encrypted by computing device 204, such as by using a symmetric key known to devices 202 and 204, or by using a public key associated with computing device 202. Encrypting the published notification provides security so that only those computing devices for which the published notification is intended (which are those computing devices that are able to decrypt the encrypted notification) can access the data in the notification. Additionally, the published notification can be digitally signed by computing device 204, such as by using a private key of computing device 204. Computing device 202 can then use a public key of computing device 204 to verify that computing device 204 was indeed the source of the published notification. Digitally signing the published notification provides an assurance to the computing devices receiving a notification of the source of the notification. Computing devices can thus act on (e.g., install peripheral devices) only in response to notifications received from trusted sources.

The published notification is published to one or more computing devices connected to the same network as computing device 204. This publication can be user based and/or computing device based. With user based publication, different users can log into a same computing device using different user accounts, and each of these users can have different peripheral devices installed on the computing device when the user is logged in. The notification is published to particular users, and the peripheral device is installed only for those users for which the notification is published. Accordingly, the notification can be published to one user of the computing device, but not to another user of the same computing device. The different users to which the notification is published can be users that are part of particular domains, particular network groups, and so forth. For example, all of the users in a particular house can be part of the same network group, the children in a house can be part of one network group while the adults are part of a different network group, and so forth.

Computing device based publication refers to communicating the notification to all of the computing devices connected to the same network as computing device 204 without regard for different users of those devices. Even though computing devices can have different users that log into the computing device using different user accounts, the notification is published so that each of these different users has access to the shared peripheral device. The different computing devices to which the notification is published can be particular computing devices that are included in particular domains, particular network groups, and so forth. For example, all of the computing devices within a particular home can be part of the same network group, and the notification can be published to all of those computing devices.

In one or more embodiments various filtering is also performed by local peripheral management module 224 in determining whether to publish a notification of the peripheral device. Module 224 can determine that the notification is not to be published for certain peripheral devices. This determination could be made, for example, in response to a request from a user or another component or device that notification of a particular peripheral device or particular type of peripheral device not be shared. For example, for a peripheral device that is a printer, a particular printer may be a system printer that generates a local file rather than prints a hard copy of a document. Notification of such printers may not be published. Such printers can be automatically shared, or alternatively may not be automatically shared. By way of another example, notification of only digital music players may be published and automatically shared, and notification of other types of peripheral devices is not published and is not automatically shared.

The published notification from local peripheral management module 224 is received by remote peripheral management module 216, which attempts to install peripheral device 240 as a shared peripheral device on computing device 202. Installing peripheral device 240 as a shared peripheral device on computing device 202 is similar to the installation of peripheral device 240 on computing device 204, however computing device 202 accesses peripheral device 240 remotely. Computing device 202 knows how to access peripheral device 240 from the indication of how to access peripheral device 240 that was included in the published notification received from local peripheral management module 224. In one or more embodiments, installation of peripheral device 240 on computing device 202 includes installing an operating system representation of the peripheral device on computing device 202 (e.g., a print queue if the peripheral device is a printer), the operating system representation of the peripheral device including the network path name for peripheral device 240 so that data can be communicated to and/or from peripheral device 240.

Remote peripheral management module 216 automatically installs peripheral device 240 on computing device 202. Remote peripheral management module 216 obtains any appropriate software drivers for peripheral device 240 and installs those software drivers as part of the installation process for peripheral device 240. The software drivers can be obtained from any of a variety of local and/or remote locations. For example, the software drivers may be included as part of an operating system running on computing device 202, may be obtained from a remote server (e.g., via the Internet), may be obtained from computing device 204 (e.g., a location for the drivers or the drivers themselves may be included in the published notification, or computing device 202 may otherwise access computing device 204 to obtain the software drivers), and so forth.

Remote peripheral management module 216 installs peripheral device 240 on computing device 202 without any input from the user of computing device 202. No manual intervention is required on the part of the user of computing device 202 to install peripheral device 240 on computing device 202. Rather, the installation is all performed automatically. In one or more embodiments an indication can be provided to the user, such as a message or dialog box, when peripheral device 240 is installed on computing device 202 so that the user of device 202 knows that peripheral device 240 is available.

Installation of peripheral device 240 on computing device 202 is automatic. If a problem is encountered during the installation process, such as a software driver not being available to computing device 202, then the installation process terminates and peripheral device 240 is not installed on computing device 202. Thus, rather than requesting input from the user or signaling a problem or error to the user, remote peripheral management module 216 simply does not install peripheral device 240 on computing device 202. Alternatively, in one or more embodiments remote peripheral management module 216 may request manual intervention from the user to complete the installation process, or may indicate to the user that manual intervention is needed in order for the peripheral device to be installed.

FIG. 2 is discussed with reference to peripheral device 240 being connected to computing device 204. It is to be appreciated that analogous operations are carried out if a peripheral device were to be connected to computing device 202. In response to a peripheral device being connected to computing device 202, the operations discussed above as being performed by local peripheral management module 224 are instead performed by local peripheral management module 214, and the operations discussed above as being performed by remote peripheral management module 216 are instead performed by remote peripheral management module 226.

Additionally, it should be noted that in some embodiments not all computing devices need include both a local peripheral management module and a remote peripheral management module. The local peripheral management module of a computing device manages the automatic peripheral sharing for peripheral devices connected to that computing device. Accordingly, if no peripheral device is to be connected to a particular computing device then no local peripheral management module need be included in that particular computing device. Additionally, the remote peripheral management module of a computing device manages the automatic peripheral sharing for peripheral devices connected to other computing devices. Accordingly, if no access to peripheral devices coupled to other computing devices is to be used by a particular computing device, then no remote peripheral management module need be included on that particular computing device.

Additionally, in one or more embodiments peripheral device 240 can also be uninstalled from computing device 204. Uninstalling peripheral device 240 is typically performed in response to a user request to uninstall peripheral device 240, although alternatively peripheral device 240 may be uninstalled in other situations, such as in response to a request from another component or module of computing device 204 or another device, after a threshold amount of time has elapsed after peripheral device 240 is disconnected from computing device 204, and so forth.

When uninstalling peripheral device 240, local peripheral management module 224 detects that peripheral device 240 has been uninstalled in an analogous manner to the detection that peripheral device 240 was installed as discussed above (e.g., based on a notification from a print spooler component, by accessing an operating system registry or other record, and so forth). Local peripheral management module 224 also stops publishing the notification of peripheral device 240 discussed above. Stopping publishing the notification of peripheral device 240 indicates to computing device 202 that peripheral device 240 has been uninstalled from computing device 204. In response to this indication, remote peripheral management module 216 uninstalls peripheral device 240 from computing device 202 so that peripheral device 240 is no longer accessible to computing device 202. An analogous process is used for any peripheral device that was connected to computing device 202 being uninstalled. Alternatively, rather than stopping publishing of the notification of peripheral device 240, local peripheral management module 224 can publish a separate "uninstall" notification, thereby indicating to computing device 202 that peripheral device 240 has been uninstalled.

FIG. 2 is discussed above with reference to automatic peripheral sharing module 222 being available on computing device 204 before peripheral device 240 is installed. However, situations can arise where module 222 is not available until after peripheral device 240 is installed on computing device 204. For example, automatic peripheral sharing module 222 can be an application or component installed on computing device 204 after peripheral device 240 is installed on computing device 204. Accordingly, in one or more embodiments module 222, after being installed on computing device 204, identifies peripheral devices that are already installed on computing device 204. Such peripheral devices can be identified in any of a variety of manners, such as by accessing a record of installed peripheral devices maintained by computing device 204 (e.g., in an operating system registry). Once identified, local peripheral management module 224 proceeds to automatically share the identified peripheral devices analogous to the discussion above.

Additionally, in one or more embodiments automatic peripheral sharing module 222 can be removed from computing device 204 after peripheral device 240 has been automatically shared. For example, automatic peripheral sharing module 222 can be an application or component installed on computing device 204, and can be uninstalled. In one or more embodiments, if module 222 is removed from computing device 204, then prior to removal module 222 attempts to "undo" any changes it has made. For example, if peripheral device 240 has been automatically shared then module 222 publishes a notification that peripheral device 240 has been uninstalled (or ceases publishing the notification of peripheral device 240 discussed above). In other embodiments, if module 222 is removed from computing device 204, then module 222 makes no such attempts to "undo" any changes it has made. For example, if peripheral device 240 has been automatically shared then peripheral device 240 remains automatically shared.

Figure 3:
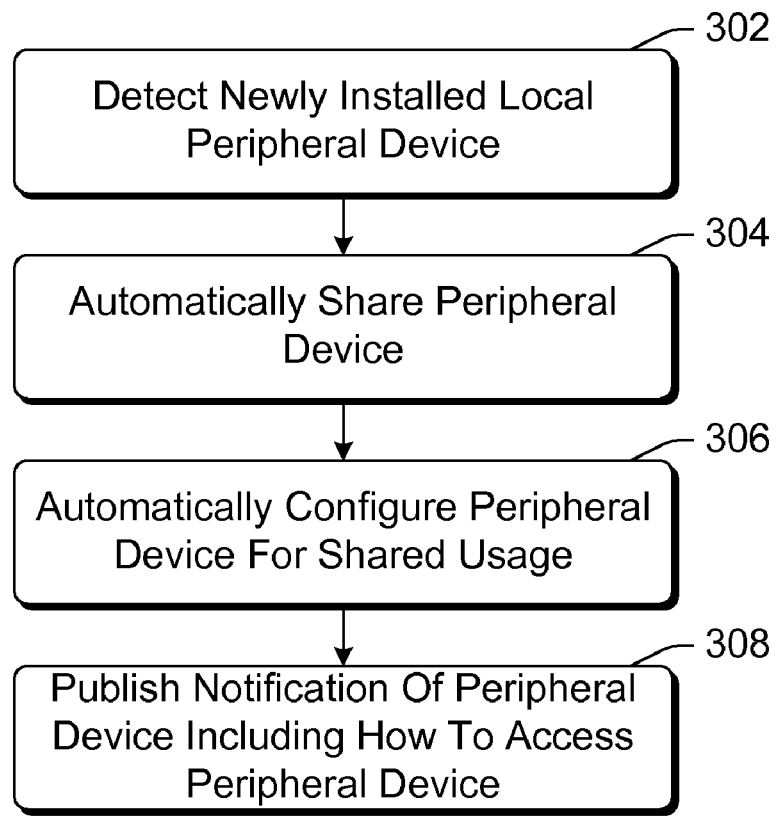
FIG. 3 is a flowchart illustrating an example process for automatic peripheral device sharing in accordance with one or more embodiments.

FIG. 3 is a flowchart illustrating an example process 300 for automatic peripheral device sharing in accordance with one or more embodiments. Process 300 is carried out by a device to which a peripheral device is connected, such as a computing device 102 of FIG. 1 or computing device 204 of FIG. 2. Process 300 can be implemented in software, firmware, hardware, or combinations thereof. Process 300 is an example process for automatic peripheral device sharing; additional discussions of automatic peripheral device sharing are included herein with reference to different figures.

Initially, a newly installed local peripheral device is detected (act 302). This newly installed local peripheral device is a peripheral device that is connected to the device implementing process 300. The newly installed peripheral device can be automatically detected in any of a variety of manners as discussed above.

Once detected, the peripheral device is automatically shared (act 304). Automatically sharing the peripheral device sets up the device implementing process 300 to share the peripheral device so that other computing devices can access the peripheral device as discussed above.

The peripheral device is also optionally automatically configured for shared usage (act 306). This configuration of the peripheral device can include setting various configuration values or other settings of the peripheral device and/or the device implementing process 300 when the peripheral device is operating in a shared mode as discussed above. In one or more embodiments no such configuration is performed, in which case act 306 need not be performed.

A notification of the peripheral device including how to access the peripheral device is also published (act 308). As discussed above, this publication of the notification informs other computing devices that the peripheral device has been installed on the device implementing process 300 and is available for sharing, as well as how to access the peripheral device.

It should be noted that in one or more embodiments situations can arise where the peripheral device is not automatically shared in act 304. For example, certain peripheral devices or particular installation processes may not allow for automatic sharing of peripheral devices, a user-selectable option to not automatically share peripheral devices may be set, and so forth. In such situations, however, a user could still manually share a peripheral device by requesting that the peripheral device be shared. In response to such a request, a component (e.g., a peripheral management component such as a print spooler component if the peripheral device is a printer) shares the peripheral device as discussed above. A local peripheral management module (e.g., module 224 of FIG. 2) is notified of this manual sharing, in response to which acts 306 and/or 308 are performed. Thus, even though the peripheral device is not automatically shared in such situations, the peripheral device can still be automatically configured for shared usage and/or notification of the peripheral device and how to access the peripheral device can still be automatically published.

It should be noted that in one or more embodiments not all of the elements of process 300 are performed. For example, some peripheral devices may not be automatically shared in act 304. By way of another example, notification of some peripheral devices may not be published in act 308.

Figure 4:
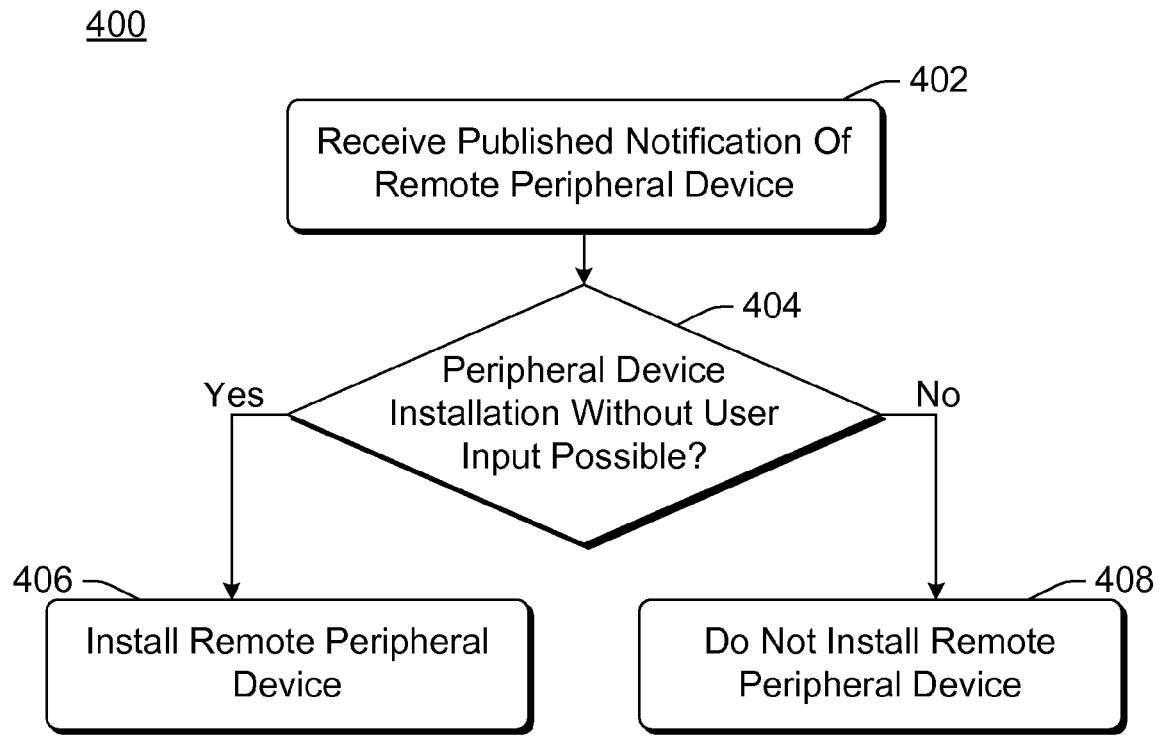
FIG. 4 is a flowchart illustrating an example process for automatic peripheral device sharing in accordance with one or more embodiments.

FIG. 4 is a flowchart illustrating an example process 400 for automatic peripheral device sharing in accordance with one or more embodiments. Process 400 is carried out by a device, such as a computing device 102 of FIG. 1 or computing device 202 of FIG. 2, and can be implemented in software, firmware, hardware, or combinations thereof. Process 400 is an example process for automatic peripheral device sharing; additional discussions of automatic peripheral device sharing are included herein with reference to different figures.

Initially, a published notification of a remote peripheral device is received (act 402). This remote peripheral device is a peripheral device that has been installed on another computing device and that has been shared to allow other computing devices to access it. For example, in FIG. 2, computing device 202 receives a published notification of a remote peripheral device (peripheral device 240) coupled to computing device 204. The published notification can be received in any of a variety of manners as discussed above.

A check is then made as to whether the remote peripheral device can be automatically installed on the device implementing process 400 without user input (act 404). If installation of the peripheral device can occur without user input, including no requests for manual intervention by the user, then the remote peripheral device is installed on the device implementing process 400 (act 406). However, if installation of the peripheral device cannot occur without user input, then the remote peripheral device is not installed on the device implementing process 400 (act 408).

Thus, it can be seen that when a peripheral device is connected to one computing device on a network the peripheral device is automatically shared and automatically installed on the other computing devices in the network. This allows the users of the other computing devices to access that peripheral device without having to perform any installation process themselves. Rather, the entire installation process can be performed automatically. No settings need be configured by the user, no requests to share a peripheral device need be entered by the user, and so forth.

Figure 5:
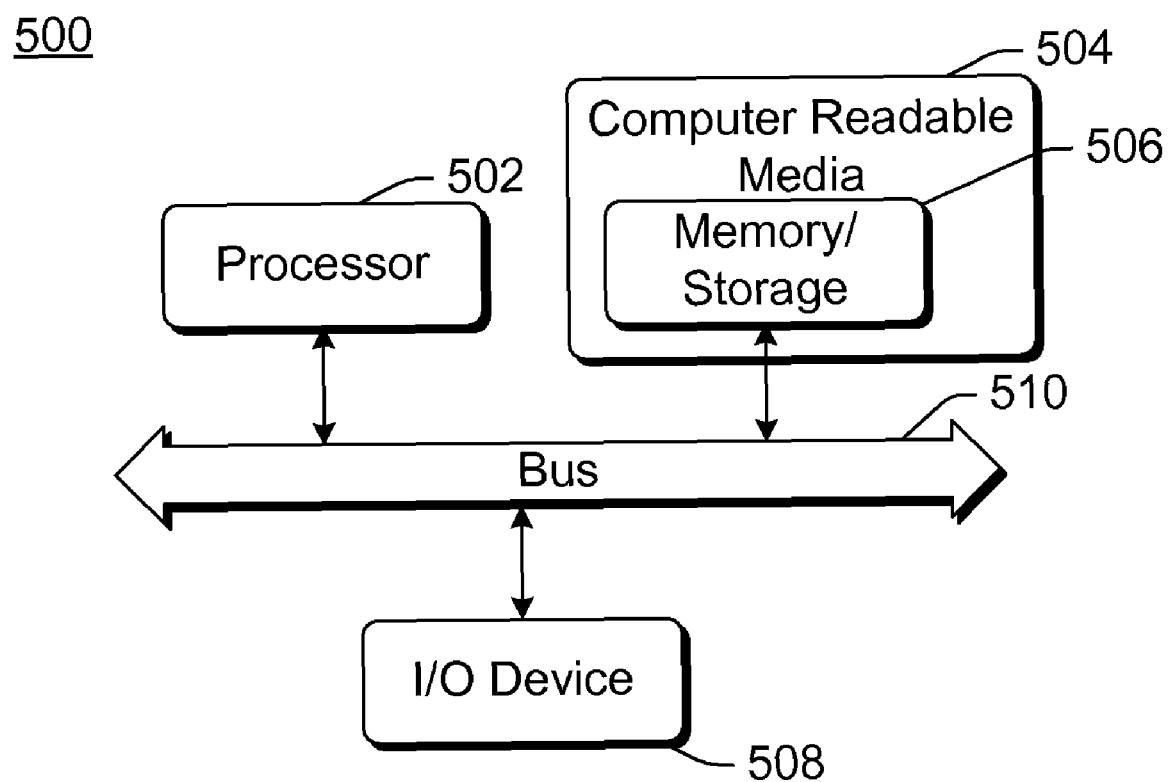
FIG. 5 illustrates an example computing device that can be configured to implement the automatic peripheral device sharing in accordance with one or more embodiments.

FIG. 5 illustrates an example computing device 500 that can be configured to implement the automatic peripheral device sharing in accordance with one or more embodiments. Computing device 500 can be, for example, a computing device 102 of FIG. 1, or a computing device 202 or 204 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or I/O device(s) 508 can be included as part of, or alternatively may be coupled to, computing device 500. Bus 510 represents one or more of any of several types of bus structures, including a memory bus or memory controller, a peripheral bus, an accelerated graphics port, and a processor or local bus using any of a variety of bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit (s) 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored on one or more computer readable media, further description of which may be found with reference to FIG. 5. The features of the automatic peripheral device sharing techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors of a computing device, cause the one or more processors to:
   detect a peripheral device that has been newly installed on the computing device;
   share the peripheral device with one or more additional computing devices coupled to the computing device; and
   automatically publish a notification of the peripheral device to the one or more additional computing devices, the notification including a message that includes a direct path to the peripheral device indicating how the one or more additional computing devices can access the peripheral device.

2. One or more computer storage media as recited in claim 1, wherein to share the peripheral device is to automatically share the peripheral device in response to detection of the peripheral device being newly installed on the computing device.

3. One or more computer storage media as recited in claim 1, wherein the multiple instructions further cause the one or more processors to automatically configure the peripheral device so that users of the one or more additional computing devices have permission to access the peripheral device.

4. One or more computer storage media as recited in claim 1, wherein the multiple instructions further cause the one or more processors to encrypt the message.

5. One or more computer storage media as recited in claim 1, wherein the multiple instructions further cause the one or more processors to digitally sign the message.

6. One or more computer storage media as recited in claim 1, wherein the one or more additional computing devices are coupled to the computing device via a network.

7. One or more computer storage media as recited in claim 1, wherein the multiple instructions further cause the one or more processors to include, as one of the one or more additional computing devices, each computing device that is part of a same network group as the computing device.

8. One or more computer storage media as recited in claim 1, wherein the peripheral device comprises a printer, and wherein to detect the peripheral device is to receive a notification from a print spooler component of the computing device that the printer has been newly installed on the computing device.

9. One or more computer storage media as recited in claim 1, wherein the multiple instructions further cause the one or more processors to determine that notification of one or more particular peripheral devices is not published, and wherein to automatically publish the notification is to automatically publish the notification only if the peripheral device is not one of the one or more particular peripheral devices.

10. One or more computer storage media as recited in claim 1, wherein the multiple instructions further cause the one or more processors to:
    detect that the peripheral device has been uninstalled from the computing device; and
    automatically publish, to the one or more additional computing devices, a notification that the peripheral device has been uninstalled from the computing device.

11. One or more computer storage media having stored thereon multiple instructions that, when executed by one or more processors of a computing device, cause the one or more processors to:
    receive a published notification of a remote peripheral device coupled to a different computing device, the notification including a message that includes a direct path to the peripheral device indicating how one or more additional computing devices can access the peripheral device;
    determine whether the remote peripheral device can be automatically installed on the computing device without user input; and
    install the remote peripheral device on the computing device only if the remote peripheral device can be automatically installed on the computing device without user input.

12. One or more computer storage media as recited in claim 11, wherein the instructions that cause the one or more processors to determine whether the remote peripheral device can be automatically installed on the computing device without user input include instructions that cause the one or more processors to determine whether a software driver for the remote peripheral device is available to the computing device, wherein the remote peripheral device can be automatically installed on the computing device without user input only if the software driver for the remote peripheral device is available to the computing device.

13. One or more computer storage media as recited in claim 11, wherein the multiple instructions further cause the one or more processors to:
    receive a notification that the remote peripheral device has been uninstalled from the different computing device; and
    uninstall, in response to receipt of the notification that the remote peripheral device has been uninstalled from the different computing device, the remote peripheral device from the computing device.

14. One or more computer storage media as recited in claim 11, wherein the multiple instructions further cause the one or more processors to:
    verify a digital signature of the published notification; and
    install the remote peripheral device on the computing device only if the published notification is verified as being from a trusted source.

15. A method implemented in a computing device, the method comprising:
    detecting a first peripheral device connected to the computing device that has been newly installed on the computing device;
    automatically sharing the first peripheral device, in response to detecting the first peripheral device being newly installed on the computing device, with one or more additional computing devices coupled to the computing device;
    automatically publishing a first notification of the first peripheral device to the one or more additional computing devices, the first notification including a message that includes a direct path to the first peripheral device indicating how the one or more additional computing devices can access the first peripheral device;
    receiving a second published notification of a second peripheral device coupled to one of the one or more additional computing devices, the second notification including an indication of how the computing device can access the second peripheral device;

determining whether the second peripheral device can be automatically installed on the computing device without user input; and installing the second peripheral device on the computing device only if the second peripheral device can be automatically installed on the computing device without user input.

16. A method as recited in claim 15, wherein determining whether the second peripheral device can be automatically installed on the computing device without user input comprises determining whether a software driver for the second peripheral device is available to the computing device, wherein the second peripheral device can be automatically installed on the computing device without user input only if the software driver for the second peripheral device is available to the computing device.

17. A method as recited in claim 15, wherein the one of the one or more additional computing devices includes each computing device that is part of a same network group as the computing device.

* * * * *